(12) United States Patent
Douche et al.

(10) Patent No.: US 6,302,681 B1
(45) Date of Patent: Oct. 16, 2001

(54) INJECTION MOLD FOR MOLDING OF A GLAZING

(75) Inventors: Jean-Pierre Douche, Plessis Brion; Philippe Armand, Paris, both of (FR)

(73) Assignee: Saint-Gobain Vitrage International, Courbevoie (FR)

( * ) Notice: Subject to any disclaimer, the term of this patent is extended or adjusted under 35 U.S.C. 154(b) by 0 days.

(21) Appl. No.: 09/598,302

(22) Filed: Jun. 21, 2000

Related U.S. Application Data

(62) Division of application No. 07/928,784, filed on Aug. 13, 1992, now Pat. No. 6,106,758.

(30) Foreign Application Priority Data

Aug. 13, 1991 (FR) .................................................. 91 10263

(51) Int. Cl.⁷ .............................. B29C 45/04; B29C 45/14
(52) U.S. Cl. ............................ 425/575; 425/183; 425/442
(58) Field of Search ................................... 425/575, 442, 425/183, 574

(56) References Cited

U.S. PATENT DOCUMENTS

| | | | |
|---|---|---|---|
| 2,864,124 | 12/1958 | Strauss | 425/525 |
| 3,670,062 * | 6/1972 | Nowicki | 264/97 |
| 4,439,123 * | 3/1984 | Sano et al. | 425/183 |
| 4,708,633 | 11/1987 | Hayashi et al. | 425/574 |
| 4,861,258 * | 8/1989 | Marguaria | 425/575 |
| 4,946,358 * | 8/1990 | Okuda et al. | 425/183 |
| 5,053,173 | 10/1991 | Sticht | 264/241 |
| 5,230,908 * | 7/1993 | Morgan | 425/183 |

FOREIGN PATENT DOCUMENTS

| | | | |
|---|---|---|---|
| 2849604 | 5/1980 | (DE) . | |
| 3720214 * | 12/1987 | (DE) | 425/575 |
| 0268174 | 5/1988 | (EP) . | |
| 793394 * | 8/1960 | (FR) | 425/575 |
| 1311191 | 10/1962 | (FR) . | |
| 1516969 | 3/1968 | (FR) . | |
| 2073141 | 9/1971 | (FR) . | |
| 2343590 | 10/1977 | (FR) . | |
| 2039463 | 8/1980 | (GB) . | |
| 62-75452 | 10/1988 | (JP) . | |
| 63-242511 | 10/1988 | (JP) . | |
| 2125712 | 5/1990 | (JP) . | |
| 63-279063 | 5/1990 | (JP) . | |
| 4249125 * | 9/1992 | (JP) | 425/575 |

\* cited by examiner

Primary Examiner—Nam Nguyen
Assistant Examiner—Thu Khanh T. Nguyen
(74) Attorney, Agent, or Firm—Oblon, Spivak, McClelland, Maier & Neustadt, P.C.

(57) ABSTRACT

A process and a device for duplicate molding on at least one part of a glazing, placed in a mold, particularly a monolithic or laminated glazing, of glass and/or of transparent plastic, by injection of plastic has at least two stations: a main station for the pressurization of a first mold, the injection of a plastic and the release of the molding pressure of the mold. Additional operations are being performed on a second mold at an auxiliary station. Transfers of the molds from the auxiliary station to the main station and vice versa are provided.

6 Claims, 1 Drawing Sheet

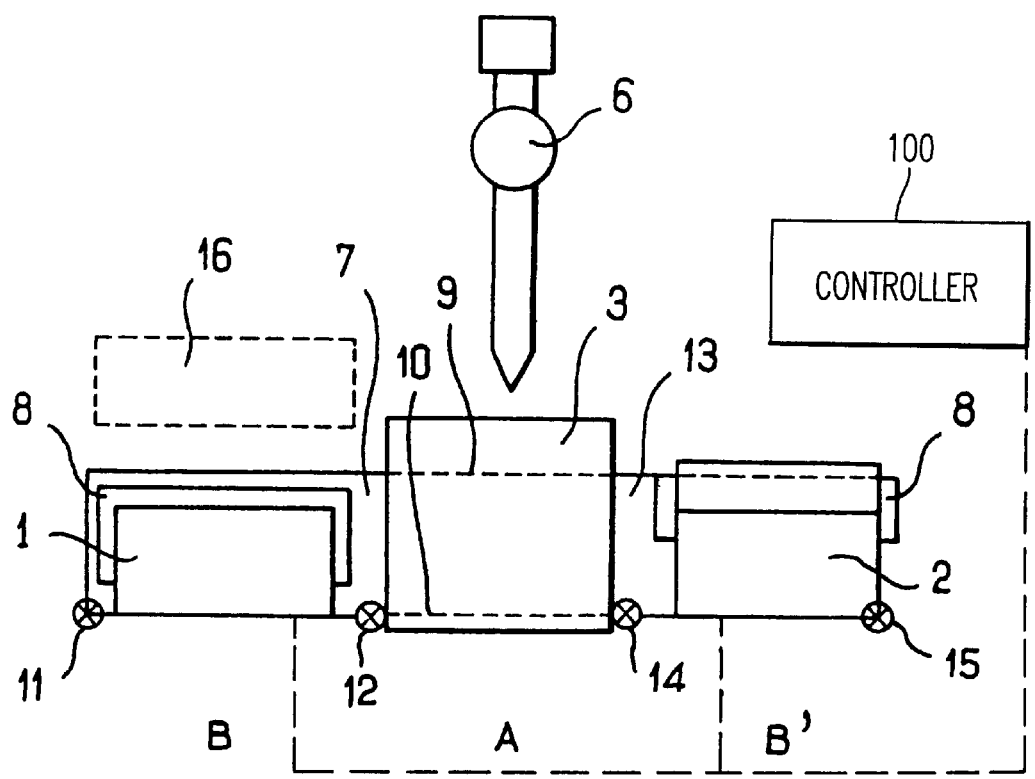
FIG_1
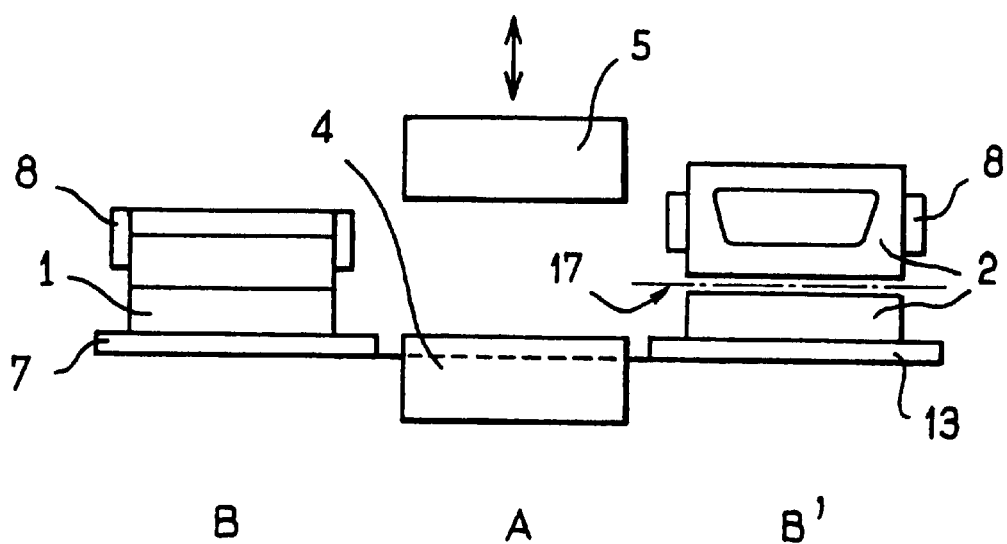
FIG_2

INJECTION MOLD FOR MOLDING OF A GLAZING

This application is a Division of application Ser. No. 07/898,784 filed on Aug. 13, 1992, now U.S. Pat. No. 6,106,758.

BACKGROUND OF THE INVENTION

1. Field of the Invention

This invention relates to the encapsulation or duplicate molding of a glazing of glass and/or plastic by injection of a plastic on at least one part of the glazing. The invention relates in particular to a process and a duplicate molding device using this process.

2. Description of the Related Art

The process of encapsulation by injection of plastics on at least one part of a glazing placed in a mold includes the following operations: placing the glazing in a mold, optionally, placing elements in addition to the glazing in the mold, before and/or after the placing of the glazing, closing and pressurizing the mold, injecting plastics, releasing the molding pressure, polymerizing or cooling of injected plastic, opening the mold, extracting the duplicate molded glazing.

These various operations can be performed at a single station. In this case, the press, placed at this station, is monopolized during all these operations. Furthermore, the press must then be provided with a large opening width to facilitate access to the contents of the mold. These two imperatives necessitate a low rate of production and therefore a high cost.

To improve this rate, a process of the turntable type has been proposed; the various operations constituting this process are performed at different stations, with transfer by rotation from one station to the next. A turntable process has been proposed in which all the operations are performed at four different stations. The production of a duplicate-molded glazing thus requires the use of four pieces of equipment (molds). The investment in equipment for this type of device is therefore high.

Furthermore, in case of a problem on one of the pieces of equipment, the entire system is tied up. For obvious reasons of equipment cost, this device has been applied only to the production of parts with small dimensions, produced on a large scale.

SUMMARY OF THE INVENTION

It is an object of the present invention to eliminate the above drawbacks.

The invention has another object to minimize the time of a production cycle of a duplicate-molded glazing, with flexibility of use and a reduced cost.

The invention proposes a process of injecting plastics on at least a part of a monolithic or laminated glazing, of glass and/or transparent plastic, placed in a mold situated horizontally, a process in which the essential operations are performed at two different stations, the operations of molding pressurization of a mold, of injection of plastics, of release of the molding pressure in the mold being performed at one station, known as the main station, while the essential additional operations are performed on a second mold at another station, known as an auxiliary station, the two molds each being assigned to an auxiliary station and being transferred from their auxiliary station to the main station and vice versa separately. The essential additional operations are, in particular, the placing of the glazing in the mold, the optional placing of additional elements or inserts, the closing of the mold, the opening of the mold, the removal of the duplicate-molded glazing.

One of the advantages of the process operating with two molds, each of them being assigned to an auxiliary station according to the invention, is that it makes it possible, using two pieces of equipment (molds), to duplicate mold jointly two glazings which can, if necessary, be different as to their shape and/or dimensions. By mold is meant, according to the invention, the lower old and the countermold.

While a portion of the operations of the process occur at the main station for a glazing contained in one mold, other operations of the process are performed at the auxiliary station for a second glazing contained in another mold. The rate of production is thus increased without thereby multiplying the number of pieces of equipment.

According to an embodiment of the invention, a main station and two auxiliary stations with two pieces of equipment are used.

In this case, a transfer is envisaged for the direct passage from each of the two auxiliary stations to the main station and vice versa. Since the transfers are separate, in case of any trouble at an auxiliary station, the other auxiliary station can function in connection with the main station.

In another variant of the invention, a main station and more than two equivalent auxiliary stations are used with a direct transfer for a mold from each of the auxiliary stations to the main station and vice versa.

According to an advantageous characteristic of the process according to the invention, after the closing of the mold, an intermediate pressure is applied to the glazing in the mold, this intermediate pressure being, preferably, maintained during the transfers of the mold.

By intermediate pressure is meant a pressure higher than the atmospheric pressure, but lower than the molding pressure.

This intermediate pressure applied to the glazing at the auxiliary station after the closing of the mold makes it possible to regulate the ability of the glazing to bear molding pressures.

A reduced pressurization of the mold before the injection operation is particularly advantageous. It thus makes it possible to limit the danger of breakage and, if necessary, to withdraw the broken glazing before reaching the end of the production cycle of the duplicate-molded glazing as a result of any detection system. Such breakage can result from a poor placing of the glazing in the mold or from a defect in the quality of the glazing.

Another advantage of a reduced pressure during the transfer of the mold after the injection operation is that this transfer time is used for the polymerization and/or the cooling of the plastic.

The invention also relates to an encapsulation device comprising a main station equipped with a press and an injection unit and at least two auxiliary stations, connected directly to the main station with transfer tables that are separate from one another, and at least two pieces of equipment or molds.

One of the advantages of the invention is that at each auxiliary station at least one mold provided with a transfer device is assigned. This device is, in particular, a transfer table having a bidirectional linear movement.

Thus, according to the invention, each mold is autonomous; a piece of equipment can be disabled without the entire device being immobilized. The idle times relative to the restarting of the process for injecting the plastic after a stop corresponding to a purging of the injection head are thus avoided. Actually, the constituents of the plastic, during this period, can easily be degraded, indeed become solidified in the injection unit. Furthermore, the mold of a produced part corresponds to the produced part; the production of a part therefore uses only one piece of equipment.

These molds can receive glazings of distinct shapes and/or dimensions. For example, a rear window and an automobile windshield can be produced jointly.

According to a preferred embodiment of the invention, the closing and injection station comprises only one press and only one injection unit. Of course, to be able to inject plastics of different nature, or at different flow rates (the duplicate molding of a windshield does not require the same flow rate as the duplicate molding of an automobile rear window), the press and the injection unit are suited, according to the invention, for these additional constraints. Thus, the press can be equipped with an "all or nothing" hydraulic closing system with pressure regulation and the injection unit is advantageously controlled by a device provided with a software package comprising several specific injection programs. This device provided with a software package further makes it possible to regulate the entire process, several orders being able to be given simultaneously. These elements will be described in a more detailed way in the following description.

To improve accessibility to the contents of the mold, according to a preferred embodiment of the invention, the mold and the countermold are mounted on a mold holder provided with a sheet-holder system, i.e., the mold itself is integral with the lower part of the mold holder, while the countermold is integral with the upper part of the mold holder, this upper part being able to be opened by pivoting under the action of at least one cylinder, preferably two, carried on the mold holder. Such a system, as its name indicates and by the action of the cylinder or preferably two cylinders, makes possible an opening of the sheet holder around an axis parallel to the transfer table, which allows a lateral accessibility and a frontal accessibility. This double accessibility is necessary in the technique for encapsulation of a glazing. During the loading operation, both the inserts and the glazing are deposited in the mold. Since the monolithic or laminated glazing of glass is a fragile material, possibly bent in shape, it is preferable that it be well positioned, with its outside face on the side of the mold, to prevent any display of the injection points on the resulting product.

Another advantage of such a sheet-holder system provided with at least one cylinder for opening and closing is that the period of transfer of a mold from one station to the next can be used, an intermediate pressure being maintained by the cylinder or cylinders, particularly during the polymerization and/or the cooling of the duplicate molding plastic. Maintaining this pressure further makes it possible to reduce the danger of breakage of the glazing, particularly when the glazing is of glass.

According to the invention, the operations such as loading, unloading the mold, placing additional elements in the mold, etc., can be automated. Actually, these operations are performed, according to the invention, at a single station, located apart from the press. In addition, access to the mold is facilitated thanks to the sheet-holder system. Furthermore, according to the invention, the horizontal position of the glazing in the mold facilitates its handling and prevents any sliding. This advantage is considerable when the glazing is of glass.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a diagrammatic view of the device, seen from above, using two molds jointly; and FIG. 2 is a diagrammatic front view of the device of FIG. 1.

DETAILED DESCRIPTION OF THE PREFERRED EMBODIMENTS

In FIG. 1, two auxiliary stations B and B' placed on both sides of a main station A.

At each auxiliary station, B and B', a glazing, not shown, will be duplicate-molded in a mold 1 and 2, respectively.

Station A is equipped with a press 3 having two plates: a stationary lower plate 4 and a mobile upper plate 5, and with an injection unit 6.

Injection unit 6, particularly in the case of injection of thermoplastics, includes a computer (not shown) making possible, for the same injection head, several specific injection programs. This computer can be the one marketed by the Allen Bradley Company under the name "Q.D. injection." Molds of different shapes and/or dimensions can thus be used jointly.

In the case of RIM (Reaction-Injection-Molding) applications, injection unit 6 includes a module for two-component pressing by a positive displacement pump. This module has the advantage of eliminating the filling phase, present in the case of metering by a metering ram. Further, it advantageously controls the injection pressure in real time. Two molds of distinct shapes and/or dimensions can, if necessary, thus be used for the same mixing head. A computer (device provided with a software package) advantageously controls these two functions. This computer for RIM injection is, for example, the one marketed by the Kraus Maffei company.

A bidirectional transfer table 7 transfers the mold 1 between station A and station B. This transfer table 7 is the lower part of a mold holder whose upper part 8, such as a sheet holder, opens by pivoting by up to 90° around an axis 17 (shown in FIG. 2 for mold 2), due to the action of at least one cylinder (not shown) carried on the mold holder. Table 7 is displaced on two rails 9 and 10 crossing press 3 by being driven by a cylinder (not shown). Its movement is limited from station B to station A. Two adjustable position stops 11 and 12 are placed along the rails. Thus, for example, table 7 is stopped by stop 12 when station A is occupied by mold 2, for example.

On another side, a second bidirectional transfer table 13 displaced on two rails 9 and 10 provides the transfer of mold 2 between station B' and station A, according to the same principle as table 7. Two adjustable position steps 14 and 15 are also placed along rails 9 and 10. Each mold, 1 or 2, has its movement controlled by the computer 100, independently of one another.

Mold 1 is shown in closed position at station B, mold 2 is shown open at station B'. Therefore both are shown in their auxiliary station for convenience of representation, although normally, during operation, when a mold is at its auxiliary station, the other is at the main station. The system of opening the upper mold part up to an angle of 90°, makes possible a great accessibility of the contents of the mold.

A suction box 16 can be installed apart from auxiliary stations B and B', particularly when RIM-type plastics are involved.

Advantageously, solvated organic compounds such as a mold release agent, or a paint protecting the plastic from ultraviolet radiation, can be sprayed on the mold.

A box for removal of polymerized material in the feed ducts of the mold, not shown, can also be present, particularly when the injected material has a thermoplastic nature.

Press 3 is equipped, according to the invention, with two plates, a stationary lower plate 4 and a mobile upper plate 5 (FIG. 2). The vertical travel of upper plate 5 can be small, thus limiting the cycle time. Mold 1, or mold 2, is placed on lower plate 4.

The closing of the press is by use of a hydraulic circuit (not shown) and is controlled, for example, by an "all or nothing" device: upper plate 5 travels from one end of its stroke to the other without possibility of intermediate stopping. The travel time is thus short.

Press 3 according to the invention makes possible the encapsulation both of thermoplastic type materials and two-component type materials, for example of the RIM type.

The press closing force, proportional to the applied pressure, guarantees fluid tightness, thus preventing flashes. According to the invention, the closing force of the press can vary from $4 \cdot 10^5$ to $5 \cdot 10^6$ Newtons. Actually, viscous materials of the thermoplastic type generally require a closing force on the order of $4 \cdot 10^6$ to $5 \cdot 10^6$ Newtons; two-component plastics of the RIM type, generally less viscous, usually require a closing force on the order of $4 \cdot 10^5$ to $5 \cdot 10^5$ Newtons. The closing force is adjusted and controlled, according to the invention, by a programmable hydraulic pressure limiter.

The following example describes, in a nonlimiting way, the series of the various operations performed during the encapsulation of two glazings, jointly, according to the device described in connection with FIGS. 1 and 2.

Molds 1 and 2 can have different shapes and/or dimensions.

Mold 1, closed and containing the glazing ready to be encapsulated, is at station A; mold 2, open, is located at station B'. A pressure proportional to the surface of the plastic to be injected, is applied by the plates of the press to mold 1. The fluid tightness of mold 1 thus being assured, the plastic, for example a thermoplastic polyurethane, is injected. After injection is terminated, the molding pressure in the mold is released while preserving an intermediate mold closing pressure due to the action of the cylinders of the sheet-holder system. Mold 1, mounted on the mold holder which is supported by transfer table 7, is transferred to station B. The polymerization of the plastic occurs during and after the transfer. All of these operations last about one to two minutes.

During the sequence of these operations, at auxiliary station B', a mold release agent is applied to mold 2; an anti-ultraviolet radiation paint is then sprayed there. Optionally, additional elements such as fastening and guiding elements are loaded in mold 2, as well as a glazing. Mold 2 is then closed by the sheet-holder system. All of these operations last about one to two minutes. Mold 2 is then transferred by transfer table 13 from station B' to station A, previously released from mold 1, and is placed on lower plate 4 of press 3. The transfer of mold 2 from station B' to station A can be performed simultaneously with the transfer of mold 1 from station A to station B.

During the period necessary for the molding pressurization, which can be different from that used previously, and for the injection of the plastic into mold 2, the duplicate-molded glazing is unloaded from mold 1. Again, a mold release agent, then an anti-ultraviolet radiation paint are sprayed on mold 1. A second glazing, identical with the unloaded glazing, is then loaded in mold 1 together with optionally additional elements. Mold 1 is then closed and put under intermediate pressure by action of the cylinders of the sheet-holder system and is transferred to station A, which has been released from mold 2, the latter being located at station B' or between station A and station B'.

All the auxiliary operations, relative either to mold 1 or to mold 2, such as loading, unloading of the glazing, placing of additional elements, spraying of mold release agent or anti-ultraviolet radiation paint, polymerization of the plastic, cooling, etc., are performed in off time, i.e., during the period necessary for the pressurization, the injection and the release of the molding pressure of the other mold.

Other operations, not described, can also occur at the main station or at the auxiliary station.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for duplicate molding on at least one part of a monolithic or laminated transparent glazing, comprising:

a pressing station having a press and a plastic injector;

a first auxiliary station at one side of the pressing station;

a first mold positionable in one of said pressing station and said first auxiliary station;

a first bidirectional transfer table for moving the first mold between said pressing station and said first auxiliary station;

a second auxiliary station at another side of the pressing station;

a second mold positionable in one of said pressing station and said second auxiliary station; and a second bidirectional transfer table for moving the second mold between said pressing station and said second auxiliary station, wherein said second bidirectional transfer table is driven to be movable independently of the movement of said first bidirectional transfer table.

2. The apparatus of claim 1, including a mold holder on which a lower part of each of said first and second molds is mounted, each of said mold holders having a portion adapted for opening said mold by pivoting an upper part of the mold about an axis parallel to the transfer table.

3. The apparatus of claim 2, wherein each of said mold holders comprises one of said transfer tables.

4. The apparatus of claim 2, wherein each of said first and second molds has a different shape.

5. The apparatus of claim 1, including a controller adapted to control the first and second transfer tables.

6. The apparatus of claim 1, including a stop adapted for stopping respective ones of said molds from entering said pressing station when the other of said molds is in said pressing station.

* * * * *